March 6, 1962    R. E. ASHBY    3,023,733
AUTOMATIC POULTRY WATERER VALVE
Filed Jan. 16, 1959    2 Sheets-Sheet 1
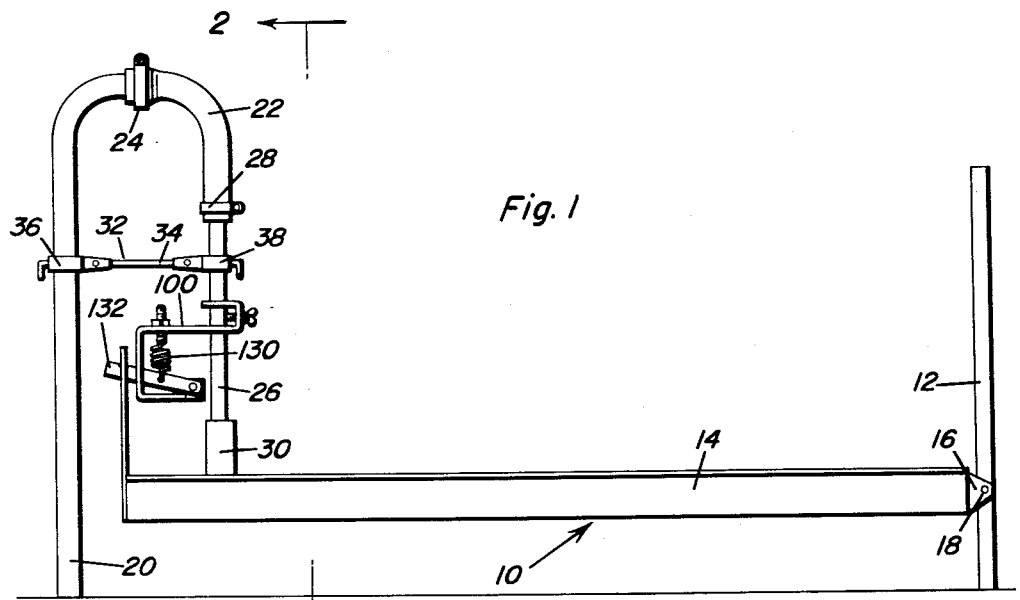
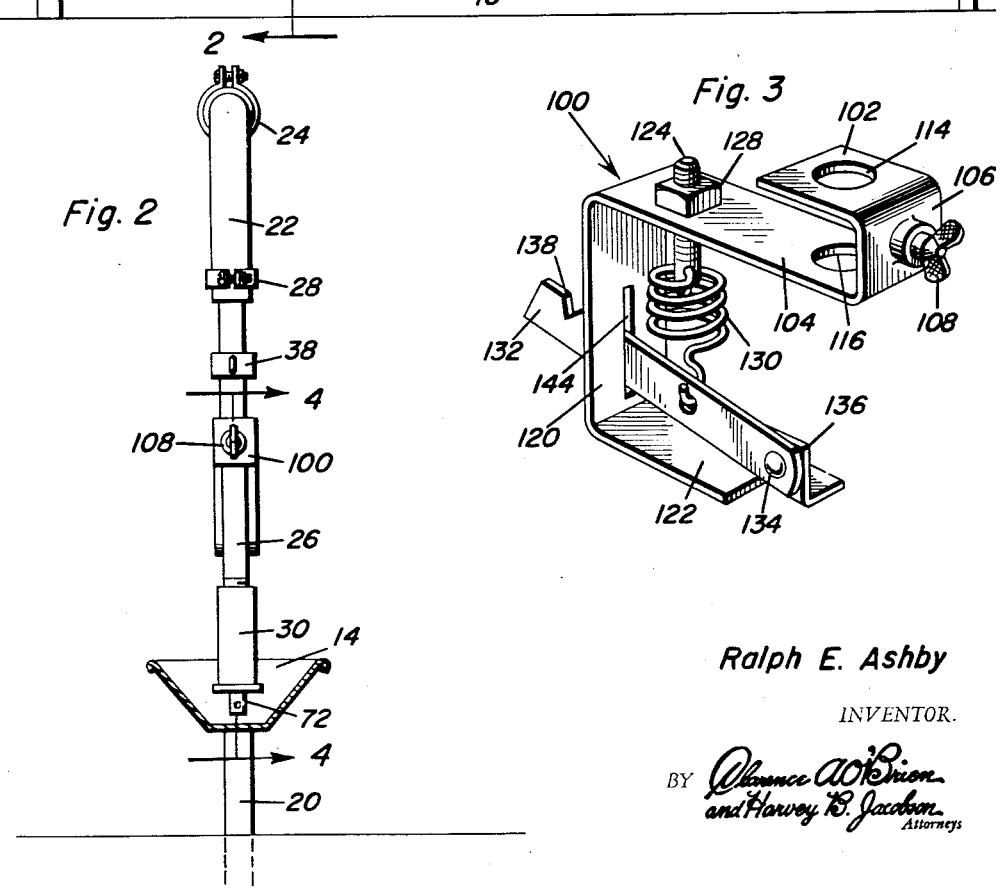
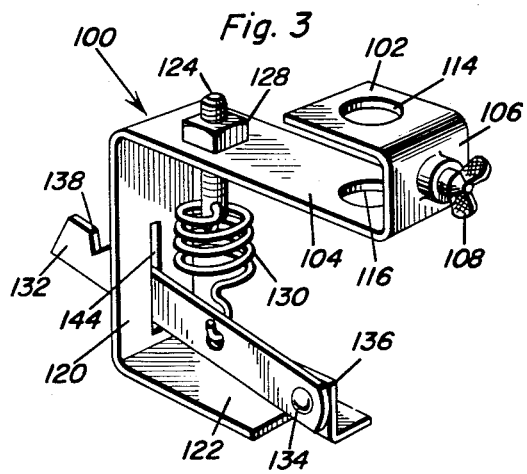
Ralph E. Ashby
INVENTOR.

March 6, 1962  R. E. ASHBY  3,023,733
AUTOMATIC POULTRY WATERER VALVE
Filed Jan. 16, 1959  2 Sheets-Sheet 2
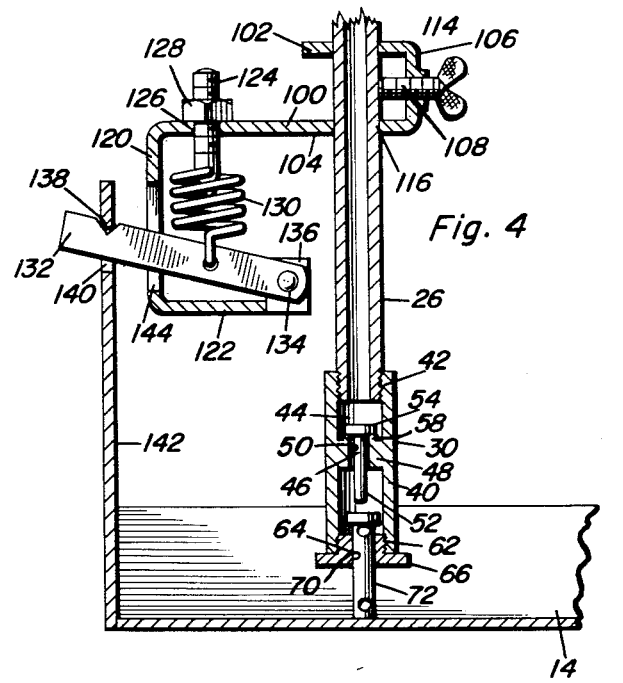
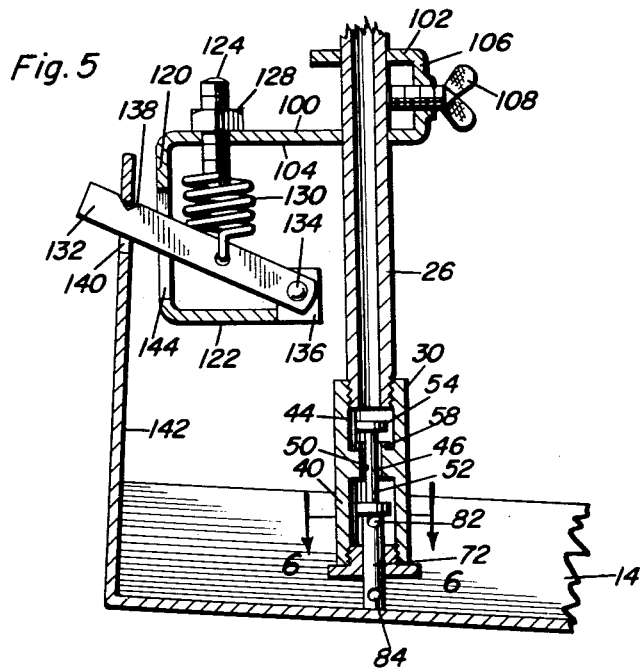
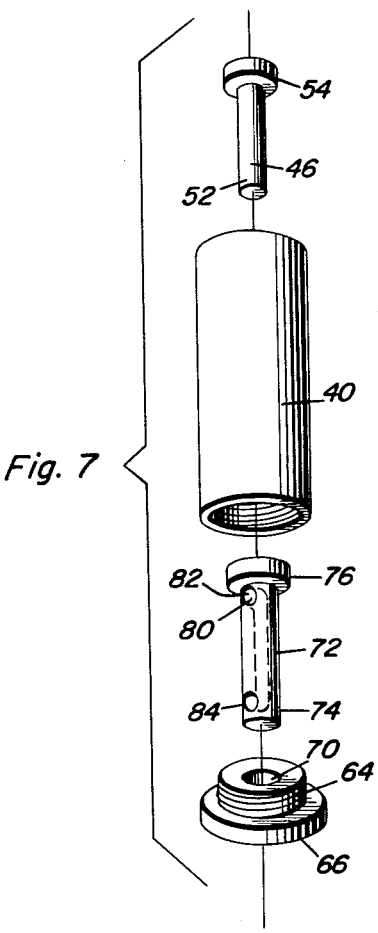
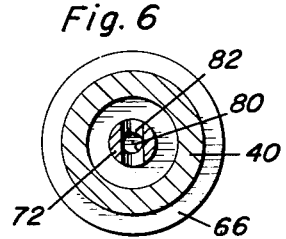
Ralph E. Ashby
INVENTOR.

United States Patent Office 3,023,733
Patented Mar. 6, 1962

3,023,733
AUTOMATIC POULTRY WATERER VALVE
Ralph E. Ashby, P.O. Box 52, Downsville, La.
Filed Jan. 16, 1959, Ser. No. 787,170
10 Claims. (Cl. 119—81)

This invention relates to poultry watering devices and more particularly to an improvement and simplification of watering devices for poultry.

An object of the invention is to provide a simplified automatic poultry waterer wherein the valve for admitting water to the poultry trough has no springs, but coacts with a spring suspension for the trough to automatically open the springless valve when water is necessary and automatically close the springless valve when there is an ample supply of water in the the trough.

Although automatic poultry waterers are well known and are readily available in commerce, this invention provides a much simpler construction with improvements in the valve and mounting arrangement for the trough, overcoming a difficulty arising from faulty valve operation and enabling the poultry waterer to be produced at a considerable saving in cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side view of a poultry waterer constructed in accordance with the invention.

FIGURE 2 is a sectional view taken on the line 2—2 of FIGURE 1.

FIGURE 3 is a perspective view of a part of the spring suspension for one end of the trough.

FIGURE 4 is a sectional view taken approximately on the line 4—4 of FIGURE 2 and on an enlarged scale.

FIGURE 5 is a sectional view similar to FIGURE 4 but showing the waterer and its valve in a second position.

FIGURE 6 is a transverse sectional view on an enlarged scale and taken on the line 6—6 of FIGURE 5.

FIGURE 7 is an exploded perspective view of the valve.

In the accompanying drawings a poultry waterer 10 is shown, although the principles of the invention are applicable with devices for watering livestock in general. The device 10 comprises a post 12 adapted to be mounted in an upright position, and an upwardly opening watering trough 14 having mounting means, for instance a bracket 16 at one end pivotally connected by pin 18 to the post 12. Water standpipe 20 is at the opposite end of trough 14 and has a flexible hose 22 connected to its upper end by a standard fastener, for instance clamp 24. A nipple 26 is attached by pipe clamp 28 to the flexible hose 22, and it has a valve 30 at its lower end. An adjustable bracket 32 is attached to nipple 26 and standpipe 20 to hold the nipple in a selected position with reference to the standpipe. The adjustable bracket 32 is made of a bar 34 having two adjustable clamps 36 and 38 at its ends, one clamp attached to standpipe 20 and the other clamp attached to nipple 26.

Valve 30 (FIGURES 4–7) is a springless valve. It comprises a valve body 40 having an internally threaded open upper end 42 threaded onto the nipple 26. The body 40 is hollow so that there is a valve chamber 44 within which valve element 46 is operable. A transverse wall 48 extending across valve chamber 44 divides it into an upper and lower portion, and there is a passage 50 extending through wall 48 in which the valve element 46 is reciprocatable. The valve element is made of a stem 52 and a head 54, with the head seating on a raised part 58 of wall 48 around the upper end of passage 50.

Stem 52 enters the lower part of the chamber 44, while head 54 remains in the upper part of the chamber 44.

The lower end of the valve body is internally threaded as at 62 in order to accept the nut 64. The nut has a lower flange 66 which engages the lower extremity of the valve body 40, and it has a passage 70 through which valve operator and water conductor 72 is passed. The valve operator and water conductor is composed of a stem 74 (FIGURE 7) having a head 76 at its upper end. The head 76 is located in the lower part of the chamber 44, and the stem passes through the passage 70 to enter the trough 14 and engage the bottom thereof. A water conducting passageway 80 having an upper port 82 and a lower port 84 opening laterally through stem 74, conducts the water from the valve chamber to the water trough when the valve element 46 is lifted from its seat. The upper and lower ports may extend through one side of stem 74 (FIGURE 7) or may extend completely, transversely through the stem (FIGURE 6).

A mounting bracket 100 constitutes a part of a spring suspension for one end of trough 14. The mounting bracket is substantially S-shaped (FIGURES 4 and 5) and has spaced parallel component parts 102 and 104 connected by a companion part 106 in which there is threaded a setscrew 108. The setscrew engages the surface of nipple 26, and there are aligned openings 114 and 116 in parts 102 and 104 through which the nipple passes. Accordingly, the mounting bracket 100 may be adjusted along the length of nipple 26 by sliding the bracket up or down, and may be held in place by tightening the setscrew 108 once the correct or selected position of the bracket on the nipple is established.

The substantially S-shaped bracket has a part 120 perpendicular to part 104, and a part 122 parallel to part 104. A bolt 124 is passed through an opening 126 in part 104 and has a nut 128 thereon to adjust the position of the bolt with respect to the part 104. A spring 130 is attached at one end to a bolt 124 and is attached at the other end to a lever 132 intermediate the ends of the lever. The inner end of lever 132 is mounted on a pivot 134 that is carried by an upstanding ear or a pair of upstanding ears 136 on part 122. There is an upwardly opening notch 138 near the opposite end of lever 132. The lever is passed through an opening 140 in a trough supporting arm or bracket 142 which rises from one end wall of the trough. Accordingly, the notch has a part of the bracket 142 adjacent to an edge of opening 140 seated therein. As shown in FIGURE 3 the lever 132 is operable in a slot 144 in part 120 of the mounting bracket.

In operation, it is assumed that the trough has an ample supply of water (FIGURE 4). The valving element 46 in the valve 30 is in the closed position, and the spring 130 is under tension due to the water-load in the trough. Under these circumstances the trough is essentially horizontal. If it were other than horizontal, the S-bracket 100 could, of course, be adjusted on the nipple in the manner described previously to bring about the desired horizontal position.

When the water is used, the weight of the water is relieved from the trough enabling spring 130 to lift the trough at the end opposite pivot 18. As the trough lifts, the valve operator 72 is forced up and lifted to a position where the head 76 contacts the lower end of stem 52. This development lifts the head 54 of the valve element from its seat and enables water to flow through the nipple 26 into the upper part of chamber 44, through passage 50 and into the lower part of the chamber 44. As the water enters the lower part of chamber 44 it flows through port 82, passage 80 and passes through port 84 to begin filling trough 14. However as the weight of the water increases in trough 14, spring 130 extends due to the swinging or pivotal movement of lever 132. When the weight of the water is sufficient to lower the trough to the point where head 76 of valve operator 72 separates from valve element 46, the head 54 of the valve element closes the passage 50 so that no more water will pass through the chamber 44.

It will be evident that the trough-tripped valving and trough filling means is novel in a number of advantageous respects. For example, and as seen in FIGS. 4 and 5, the aforementioned operator 72 comprises a simple headed pin slidingly mounted in the screw-cap-type closure or nut at the bottom of the valve body or barrel 40. This pin functions as a follower in that it is gravity lowerable with its lower end in constant contact with the bottom of the pan or trough 14. When the trough goes down the pin lowers with it and when the trough is spring-biased up for purposes of opening the valve, the pin is pressed up by the spring-loaded trough. While the over-all valve means may be, and generally is, referred to as a gravity and pressure-responsive arrangement it will be evident that the spring-responsive trough is nevertheless necessary to bias the trough up and lift the operator pin 72 up. By having one port within the confines of the lower chamber in the valve housing or barrel as at 82 and the other one 84 out in the open and in the trough a highly desirable trip action water feeding and controlling valve construction is had.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in conjunction with a constant water level maintaining trough of a pivoted biased water-operated type; an automatic water supply and cut-off valve embodying a nipple, a barrel providing a valve body mounted on a lower end of said nipple, the bottom of said body having a nut removably connected with and closing the lower end of the body and provided centrally with a guide opening, a divider wall on the interior of the hollow portion of said body dividing said hollow portion into an upper chamber and a lower chamber, said wall having a water passage and a valve seat, said valve seat, being located in said upper chamber, a valving element embodying a head movable toward and from said seat, and a stem, extending through the passage provided therefor in said wall and into said lower chamber, and a gravity lowerable trough lifted valve operator embodying a head located in the lower chamber alternatively engageable with and releasable from a lower end of said first-named stem, and a stem slidingly mounted in said guide opening, said last-named operator stem having a water conducting passage with ports at opposite ends thereof, one of said ports being on the exterior of the valve and the other port confined and operable in said lower chamber.

2. In a poultry watering device which has a trough pivoted at one end and a water supply pipe, the combination of a bracket attached to the water supply pipe, a lever attached to the bracket, a spring connected to said lever and said bracket and opposing the movement of the lever in one direction, means connecting said lever to the end of the trough opposite to the pivoted end thereof, a normally closed valve attached to said pipe, a valve operator carried by a part of said valve and engaged by said trough when said trough is pivotally elevated to open said valve and thereby admit water into the trough from said valve, said valve embodying a hollow body communicatively attached to said water supply pipe, said valve body having an interior wall dividing the hollow portion of the body into an upper chamber and a lower chamber, said wall having a water passage affording communication of the supply pipe with the upper chamber, and said upper chamber with the lower chamber, a valve element having a valving head and a depending stem, said wall having a valve seat cooperating with said passage and located in said upper chamber, said valving head cooperating with said seat and said stem depending through said passage into the lower chamber, the cross-section of said stem being slightly less than the cross-section of said passage, and said valve operator comprising a gravity lowerable member slidingly mounted in said lower chamber, a lower end of said member depending below the bottom of the lower chamber and having constant contact with a liftable and lowerable end portion of the aforementioned trough, said gravity lowerable member having an upper end limited for operation within the confines of the lower chamber and intermittently engageable with and releasable from a cooperating lower end of said stem.

3. The device of claim 2 and wherein said valve operator embodies a stem and a head, said stem and head joined together, said head located in said lower chamber portion, said stem depending below said valve body, and said stem having a water conducting passage with ports at opposite ends thereof, one of said ports being on the exterior of said valve body and the other of said ports being in said lower chamber.

4. In a poultry watering device having a trough which is pivoted at one end and which is pivotally movable at the other end, a water supply pipe at said other end, the improvement comprising a springless gravity actuated valve connected to said pipe and movable to the open position in response to lifting movement of said trough, and resilient means connected to said other end of said trough for supporting said trough for yielding deflection, said valve comprising a hollow valve body having an internal divider wall dividing the hollow portion of the body into an upper chamber and a lower chamber, said wall having a passage therethrough affording communication between the upper and lower chambers, a valving element having a head cooperable with said passage for intermittently opening and closing the passage and a stem extending down through the passage from the upper chamber to the lower chamber, and a gravity lowerable valve operating member slidably mounted on the lower portion of the body and having an upper portion operating in the lower chamber and movable toward and from the adjacent end of said stem, and having a lower end portion projecting slidingly through the lower portion of the body and adapted to responsively contact the bottom of a constant water level maintaining trough.

5. A watering device of the class described comprising, in combination, a nipple adapted to be communicatively and operatively attached to a water supply pipe, said nipple being adapted to assume a vertical position, a bracket having an end portion adjustably mounted on said nipple, said bracket being provided with an adjustable spring-biased trough supporting lever, a constant restricted water level maintaining trough disposed in a horizontal position and having one end pivotally mounted, the other end of said trough being provided with an upstanding member releasably and operatively connected with said trough supporting lever, and a trough-responsive automatic cut-off and control valve means interposed between the trough and a lower end of said nipple, said valve means comprising a hollow elongated barrel having a valve seat therein dividing the hollow portion into upper and lower chambers, a valve element operable in said upper chamber, engageable with the seat and normally retained against the seat by water in the supply pipe under city pressure, and a trough lifted gravity lowerable valve operating member slidingly mounted in the lower portion of the valve body and having an upper end intermittently engageable with and releasable from said valve element, and having a water passage therethrough with an inlet port confined for operation within the lower chamber and a discharge port below the bottom of the valve body and engageable with the trough.

6. For use in conjunction with a constant water level maintaining trough, an automatic water supply and cut-off valve for operative and communicative connection with a water supply pipe and embodying an open-ended barrel, a divider wall on the median interior of the barrel, said divider wall having a valve seat therein and dividing the same into an upper chamber and a lower chamber, said wall having a water passage in the valve seat, said valve seat being located in said upper chamber, a valve element normally engaging the seat, confined for operation in the upper chamber and held normally against the seat by water impinging against it, a gravity lowerable trough-lifted valve element operator having an upper portion and a lower portion, the upper portion operating in contact with the valve element and the lower portion depending below the barrel and being engageable with and responsive in action to contact with the cooperating bottom of the aforementioned water trough, said operator having an elongated passageway with a water orifice at the upper end and with said upper end being confined for operation in said lower chamber, the lower portion of said operator being engageable with the interior of said trough in a manner to discharge water into the trough when the trough functions to lift the operator and remove the valve element from said seat, and trough suspending and biasing means operatively associated with the aforementioned valve operator and functioning to maintain said operator in its ready-to-function operating position.

7. The combination of claim 6 including means carried by said barrel and engaging the lower portion of said operator for limiting movement of said operator and preventing withdrawal of said operator from said barrel.

8. The combination of claim 6 wherein said trough suspending and biasing means comprises a lever attached to said trough and to said valve and yieldingly supporting said trough, means supported by said pipe and barrel and operatively associated with said lever for varying the strength of the yielding action of said lever.

9. The combination of claim 6 wherein said trough suspending and biasing means comprises a stationarily mounted bracket, a lever pivoted upon said bracket and connected to said trough, said bracket being U-shaped and having parallel horizontal upper and lower legs and a vertical web fixedly connecting said legs and having a vertical slot, means on said upper leg for mounting said bracket, means on said lower leg for pivoting said lever, said lever being guidingly and slidably extended through said slot.

10. The combination of claim 9 wherein said bracket mounting means includes a flange on said upper leg overlying the latter, registering pipe receiving apertures in said flange and upper leg, a fastener carried by said upper leg and extending between said flange and upper leg for clampingly engaging a pipe disposed through said apertures.

References Cited in the file of this patent
UNITED STATES PATENTS

| | | |
|---|---|---|
| 1,753,122 | Kielsmeier | Apr. 1, 1930 |
| 1,958,224 | Anderson | May 8, 1934 |
| 2,541,622 | Toadvine | Feb. 13, 1951 |
| 2,626,631 | Hotton et al. | Jan. 27, 1953 |
| 2,641,276 | Suter | June 9, 1953 |
| 2,752,935 | Keyser | July 3, 1956 |

FOREIGN PATENTS

| | | |
|---|---|---|
| 641,507 | Great Britain | Aug. 15, 1950 |